3,372,141
SELF-EXTINGUISHING POLYSTYRENE
RESIN COMPOSITIONS
Richard T. Dickerson and William F. Tousignant, Midland, Mich., assignors to The Dow Chemical Company, Midland, Mich., a corporation of Delaware
No Drawing. Filed Feb. 4, 1963, Ser. No. 256,109
7 Claims. (Cl. 260—45.95)

This invention concerns compositions of alkenyl aromatic polymers which are self-extinguishing or flameproof. More precisely we have found that polystyrene is a Class II self-extinguishing composition, according to Underwriter's Subject No. 94 test, with no significant degradation of other physical properties when the polymer contains a small quantity of an ether of a bromoalkenyl alcohol and a stabilizing alcohol such as the halogenated phenols and naphthols or triphenyl methanol.

The flammability of plastics is an important characteristic for certain uses. Building materials are sometimes not acceptable owing to a high degree of flammability; therefore standards have been established to exclude from the list of approved materials those which are considered to constitute a fire hazard. A composition is listed as Class II self-extinguishing according to the Underwriter's test when less than 25 seconds are required for the flame to extinguish when a burning specimen of the material is withdrawn from a flame.

It is common practice to reduce the flammability of thermoplastic polymers by incorporating a halogen-containing compound therein. Compounds containing bromine usually are more effective as flameproofing agents than those containing chlorine or other members of the halogen group. These agents, while imparting the necessary flameproofing properties, frequently cause other problems in the utilization of the resin. The flameproofing properties are thought to result from the decomposition of the additive at elevated temperatures in the flame to produce HBr, in the case of a bromine containing additive, which extinguishes the flame. Unfortunately, many of these agents decompose and release HBr at temperatures substantially below the flame temperature of the burning resins. Many plastic articles are produced by molding or extruding the resin at an elevated temperature. The self-extinguishing agents in the resin may undergo some decomposition while the resin is at this temperature, releasing HBr which corrodes the molding and extrusion equipment. Corrosion inhibitors have been added to the resin to combat this problem; however, they have not been completely effective in this regard and their presence may adversely affect other properties of the polymer. In addition to the corrosion problem the breakdown of the halogenated compound usually produces discoloration of the finished plastic which is particularly undesirable in the case of transparent plastics such as polystyrene. A further problem is that of instability to light. Self-extinguishing plastic articles which are exposed to sunlight may become discolored as a result of the photochemical effect of the actinic rays on the halogenated compounds.

It is therefore an object of our invention to produce a Class II self-extinguishing styrene polymer having high thermal stability. It is also an object to reduce the corrosivity of self-extinguishing polystyrene during molding and extrusion operations. A further object is to produce a Class II self-extinguishing composition having a high resistance to photochemical decomposition.

We have accomplished these objectives by intimately incorporating with the styrene polymer a small but effective quantity, within the range of from about 0.1 to 5 percent by weight of the polymer, of a halogen-containing mixed alkenyl-aryl ether such as a mono- or di-alkenyl-aryl ether, wherein the hydrogen atoms of the olefinic carbon atoms in the alkenyl radicals have been replaced by bromine atoms, e.g. mono- or di-(2,3,3-tribromoallyl)-aryl ether or (2,3-dibromo-2-butenyl)-aryl ether, and an aromatic hydroxy compound such as triphenyl carbinol, or a halogenated naphthol, phenol, or diphenol, containing from 1 to 3 halogen atoms selected from the group consisting of chlorine and bromine atoms and/or from one to two alkyl radicals each containing from 1 to 4 carbon atoms as nuclear substituents.

The bromo-alkenyl group appears to be uniquely stable so that there is negligible decomposition at temperatures below about 300° C., yet the ethers have adequate stability up to the flame temperature to provide effective extinguishing properties at low concentration in the styrene polymers.

The plurality of rings or aromatic nuclei such as are found in the compound 2,3,3-tribromoallyl triphenylmethyl ether, and especially the halogenated aromatic nuclei such as are found in the bromo-alkenyl ethers of halogenated naphthols, phenols and diphenols appear to be particularly effective in stabilizing the ether flameproofing agents against photochemical decomposition, while the aromatic nucleus in the molecular structure is thought to provide thermal stability. More specifically, the mixed ethers employed as flameproofing agents can be an ether of a bromine-containing alkenyl compound wherein the hydrogen atoms of the olefinic carbon atoms have been replaced by bromine atoms, and triphenyl carbinol, halogenated naphthol, a halogenated phenol, a halogenated diphenol or a halogenated alkylphenol. The bis(bromoalkenyl) ethers of halogenated diphenols such as di-(2,3,3-tribromoallyl) ether of tetrachloro- or tetrabromobisphenol, are preferred.

Among the mixed ethers which have been found to be suitable as flameproofing agents are: 2,3,3-tribromoallyl 2,4,6-tribromophenyl ether; 2,3,3-tribromoallyl 4-bromophenyl ether; 2,2 - bis[3,5 - dibromo-4-(2,3,3-tribromoalloxy)phenyl]propane; 2,3,3 - tribromoallyl triphenylmethyl ether; 2,2 - bis[3,5 - dichloro - 4 - (2,3,3-tribromoalloxy)phenyl]propane; 2,3,3 - tribromoallyl 1,6-dibromo-2 - naphthyl ether; 2,3 - dibromo - 2 - butenyl 2,4,6 - tribromophenyl ether; and 2,3 - dibromo - 2 - butenyl 2,6 - dibromo - 4 - tert.-butyl phenyl ether.

The styrene polymer can be a homopolymer of a monovinyl aromatic compound such as styrene, vinyl toluene, vinylxylene, isopropylstyrene, p-tert.-butylstyrene, chlorostyrene, dichlorostyrene, or a copolymer of any two or more of such monovinyl aromatic compounds, or a copolymer of a predominant amount of one or more of such monovinyl aromatic compounds and a minor amount of another monoethylenically unsaturated organic compound, e.g. acrylonitrile, methyl methacrylate or alpha-methylstyrene, copolymerizable therewith, or a high impact styrene polymer which contains about 2 to 20 percent by weight of a rubber such as polybutadiene or a butadiene-styrene copolymer and correspondingly from about 98 to 80 percent of a chemically combined monovinyl aromatic compound, e.g. styrene.

In preparing the compositions of the invention, it is desirable to use the minimum amount required for Class II properties to avoid the effects of the decomposition of the ether and discoloration of the resin at elevated temperatures or by photochemical breakdown. Most of the above-named ethers, when mixed with polystyrene at a concentration between about 0.1 percent and 5.0 percent by weight, produce a Class II resin without significant degradation of other properties.

The 2,3,3-tribromoallyl 4-bromophenyl ether was prepared by dissolving 20.0 grams of p-bromophenol in 50 cc. of ethanol and 25 cc. of 5 molar aqueous NaOH solution. To this solution, with stirring, was added 36.0 grams of 1,1,2,3-tetrabromopropene-1. After a period of time crystals began to separate and the reaction was completed by heating and stirring at 70-75° C. for an additional hour. The crude material was filtered off after diluting with water, stirring and cooling, then recrystallized from ethanol. Other ethers may be prepared by this method with the appropriate choice of starting materials.

Although the ether may be added to the resin by milling or mixing at elevated temperature we prefer to mix it with the monomers at the start of the polymerization to obtain a more intimate mixture and avoid thermal decomposition. Small quantities of polystyrene containing sufficient of the agent to provide a composition containing 5 percent by weight of bromine were prepared, to evaluate the various bromine compounds as self-extinguishing agents. These experimental compositions were produced by dissolving the bromine compounds in styrene monomer then polymerizing the monomer by suspension polymerization in an aqueous medium, in the presence of 0.25 percent benzoyl peroxide as catalyst, for 16 hours at 90° C., then for five hours more at 110° C. After washing and devolatilizing the polymer, standard test bars were made by compression molding. When suspension polymerization is not possible owing to either hydrolytic instability or insolubility of the ether in styrene, it may be incorporated by dissolving the polymer and the ether in a common solvent such as methylene chloride, then evaporating the solvent. The properties of the polymers containing sufficient of the ether to provide approximately 5 percent by weight of bromine in the composition are listed in Table I.

tion which yields Class II polystyrene. The thermal decomposition temperature, mold corrosion, light stability and oven stability all are improved substantially at these lower bromine concentrations. In the case of 2,3,3-tribromoallyl 2,4,6-tribromophenyl ether the test sample which exhibited a 210° T.D.T. value had a compound concentration of 6.2 percent. The concentration of the ether can be decreased to 0.25 percent thereby increasing the T.D.T. value to a level well above the preferred 250° minimum.

The amount of ether which may be added to the styrene polymer to produce a Class II resin varies with the particular ether which is used. In general we may use between about 0.1 percent and 5.0 percent by weight without imparting the undesirable physical properties which have been characteristic of the prior art materials.

The mold corrosion ratings were established on the basis that chips rated A had a bright, mirror-like finish at the end of the test. Those chips having a tarnished appearance were rated B while slightly pitted surfaces were rated C. The D rating was assigned to those having excessive pitting and covered with brown oxide.

The oven and light stability were rated A when the exposed sample bar was clear to slightly yellow. The B rating was given to those which were distinctly yellow without sufficient darkening to produce a brown tinge, whereas the C rating was given to those which were dark yellow with a slightly brown tinge. Those specimens which were brown to black in appearance were rated D.

With the sole exception of 2,3,3-tribromoallyl triphenylmethyl ether, all of the ethers in Table I have halogen

TABLE I

| Ether | T.D.T., °C. | Mold Corrosion | Light Stability | Oven Stability | S.E. Seconds | Percent for Class II S.E. |
|---|---|---|---|---|---|---|
| 2,3,3-tribromoallyl 4-bromophenyl ether | 257 | C | A | B | 0, 0 | 3.0 |
| 2,3,3-tribromoallyl 2,4,6-tribromophenyl ether | 210 | B | C | B | 0, 0 | 0.25 |
| 2,2-bis[3,5-dibromo-4-(2,3,3-tribromoalloxy)phenyl]propane | 235 | B | B | B | 0, 0 | 0.25 |
| 2,2-bis[3,5-dichloro-4-(2,3,3-tribromoalloxy)phenyl]propane | 238 | A | A | A | 0, 0 | 0.25 |
| 2,3,3-tribromoallyl 1,6-dibromo-2-naphthyl ether | 233 | | B | B | 0, 0 | 0.25 |
| 2,3,3-tribromoallyl triphenymethyl ether | >290 | A | B | B | 0, 0 | 3.0 |
| 2,3-dibromo-2-butenyl 2,4,6-tribromophenyl ether | 228 | A | C | B | 0, 0 | <1.0 |
| 2,3-dibromo-2-butenyl 2,6-dibromo-4-tert. butyl phenyl ether | 228 | | A | A | 0, 0 | 0.25 |

The thermal degradation temperature (T.D.T.) in Table I is the temperature at which HBr is liberated from the polymer composition and is indicative of mold corrosion and other degradation problems. This temperature is determined by placing a 2 gram sample of the polymer in a nitrogen-flushed test tube and immersing the tube in a temperature-controlled oil bath. After five minutes the tube is flushed with nitrogen for 10 seconds and the exit gas passed into a dilute solution of bromthymol blue indicator. A color change in the solution reveals that HBr has been liberated at that particular oil bath temperature.

Mold corrosion was determined by placing a polished steel chip on a quantity of the polymer and maintaining a tempearture of 150° C. for 15 minutes. The chip was stored for 24 hours in a room maintained at 73° F. and 50 percent relative humidity then the extent of the corrosion observed.

The oven stability was determined by placing test bars in an air oven at 150° C. for 64 hours and noting the color change at the end of that time. Light stability was determined by exposing the test bar to ultraviolet light in a Fade-Ometer at 145° F. for 50 hours.

Self-extinguishing (S.E.) properties were measured using Underwriter's Subject No. 94 test procedure. The number of seconds required for the burning polymer to extinguish after the removal of the flame was recorded. At least two tests were run for each sample. Class II self-extinguishing bars must extinguish in less than 25 seconds. It will be noted that these resin samples containing 5 percent bromine had S.E. times of 0. In view of this, the last column in the table lists the minimum concentration of the compound necessary to provide a bromine concentraatoms attached to a phenyl group in the molecule. The stability of this particular compound most likely can be attributed to the influence of the large aromatic group on the bromine-carbon bonds in lieu of the halogenated phenyl group as found in the other ethers.

In addition to the use of these ethers in transparent alkenyl aromatic polymers such as polystyrene they may also be used in high impact polystyrene which contains about 2 to 20 percent of a rubber such as polybutadiene or a butadiene-styrene copolymer and correspondingly from 98 to 80 percent of a monovinyl aromatic compound, e.g., styrene. The concentration of ether required to produce Class II self-extinguishing polymers is typically about 10 to 25 percent greater for the high impact polymers than that required for the transparent styrene polymer material, i.e., a bromoether concentration of from about 0.1 to about 8.0 percent by weight of the polymer is usually required.

We claim:

1. A self-extinguishing styrene polymer comprising the homopolymers and copolymers of monovinyl aromatic compounds containing no more than a minor amount of another monoethylenically unsaturated organic compound copolymerized therewith and containing from about 0.1 to about 5 percent by weight of a mixed bromine-containing alkenyl-aryl ether of: (1) a bromine-containing alkenyl compound wherein the hydrogen atoms on the olefinic carbon atoms in the alkenyl group have been replaced by bromine atoms and said alkenyl group contains from 3 to 4 carbon atoms; and (2) triphenyl carbinol or a halogenated phenol.

2. A polymer according to claim 1 wherein said alkenyl radical is selected from the group consisting of 2,3,3-tribromoallyl and 2,3-dibromo-2-butenyl radicals.

3. A polymer according to claim 1 wherein said ether is 2,3,3-tribromoallyl triphenylmethyl ether.

4. A polymer according to claim 1 wherein said ether is 2,2 - bis[3,5-dibromo-4-(2,3,3-tribromoalloxy)phenyl] propane.

5. A polymer according to claim 1 wherein said ether is 2,2 - bis[3,5 - dichloro-4-(2,3,3-tribromoalloxy)phenyl] propane.

6. A self-extinguishing styrene polymer comprising the homopolymers and copolymers of monovinyl aromatic compounds containing no more than a minor amount of another monoethylenically unsaturated organic compound copolymerized therewith and containing from about 0.1 to about 5.0 percent by weight of an ether of 2,3,3-tribromoallyl alcohol and a brominated phenol selected from the group consisting of 4-bromophenol; 2,4,6-tribromophenol; 2,6-dibromo-4-tert.-butyl phenol; 2,2-bis(3,5-dibromo-4-hydroxyphenyl)propane; 2,2 - bis(3,5-dichloro-4-hydroxyphenyl)propane; and 1,6-dibromo-2-naphthol.

7. A self-extinguishing high-impact styrene polymer comprising a monovinyl aromatic compound polymerized in the presence of about 2 to about 20 weight percent of a rubbery polymer, said high impact styrene polymer containing from about 0.1 to about 8.0 percent by weight of a mixed bromine-containing alkenyl-aryl ether of: (1) a bromine-containing alkenyl compound wherein the hydrogen atoms on the olefinic carbon atoms in the alkenyl group have been replaced by bromine atoms and said alkenyl group contains from 3 to 4 carbon atoms; and (2) triphenyl carbinol or a halogenated phenol.

References Cited

UNITED STATES PATENTS 3,009,888   10/1961   Mueller-Tamm et al.
3,075,944   1/1963    Wick et al.

FOREIGN PATENTS 1,135,654   9/1960   Germany.

DONALD E. CZAJA, *Primary Examiner.*

LEON J. BERCOVITZ, *Examiner.*

H. E. TAYLOR, JR., R. A. WHITE, *Assistant Examiners.*